May 8, 1928.
C. L. PAULUS ET AL
1,668,975
EYEPIECE FOR GUN SIGHTS
Filed Feb. 5, 1924
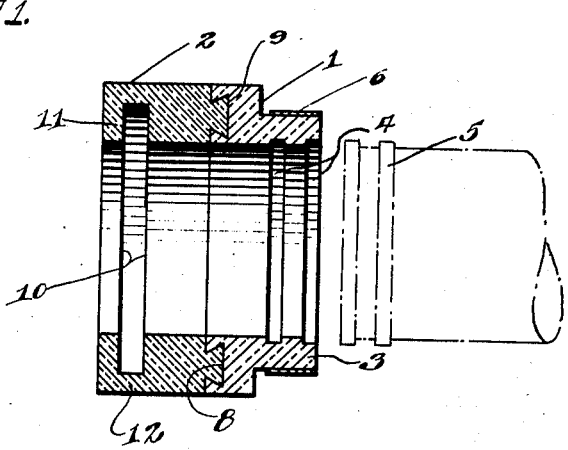
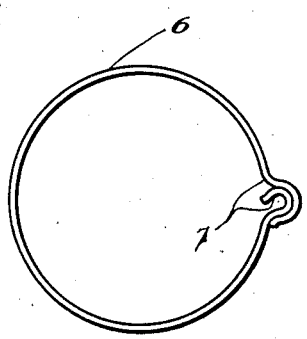
INVENTOR
Charles L. Paulus
Robert Kauch
BY
Robert H Young  ATTORNEY Patented May 8, 1928.

1,668,975

UNITED STATES PATENT OFFICE.

CHARLES L. PAULUS AND ROBERT KAUCH, OF DAYTON, OHIO.

EYEPIECE FOR GUN SIGHTS.

Application filed February 5, 1924. Serial No. 690,771.

This invention relates to an eye piece for aircraft gun sights and other optical devices and is concerned particularly with the provision of an eye piece of an extremely comfortable and serviceable type which conforms itself nicely when held to the eye in making observations and at the same time is sufficiently resilient that the jars and vibrations of the instrument arising from sudden movement or vibration of the gun mount or otherwise incident to the flight of the plane are not transmitted therethrough to the observer.

One object of the invention is to provide an eye piece composed of a mounting part of semi-resilient material such as "commercial" rubber which is well adapted for attachment to the optical device, and a face part of highly resilient conformable material such as sponge rubber which may be comfortably held to the eye as it conforms readily to the contour of the face and yields readily so that vibration and jarring are not readily transmitted therethrough. The construction further takes advantage of the fact that commercial rubber has the property of deteriorating more rapidly than sponge rubber which is of a higher quality, so that an eye piece utilizing sponge rubber for the face part and commercial rubber for the mounting part does not become unfit for service after a short period of use because of deterioration.

Another object is to provide in connection with an eye piece of the construction described, a joint connection consisting of a groove in the less resilient material of the mounting part, and a tongue in the more resilient material of the face part which may be readily compressed and inserted in the groove to hold the two parts firmly together.

A further object is to provide a groove in the highly resilient material of the face part at the extreme outer end which comes in contact with the face so that this portion, besides having a high degree of inherent resilience, is rendered far more resilient and conformable due to its walls being rendered relatively thin.

The invention is described in connection with the accompanying drawing, in which:

Fig. 1 is a central longitudinal section through the eye piece shown mounted upon the end of a sighting tube, and Fig. 2 is an end view showing the clamp for holding the eye piece on the tube.

In the past it has been the practice to provide eye pieces for gun sights and the like made uniformly of so-called "commercial" rubber. This rubber, after some service, deteriorated to such an extent as to lose practically all of its resilience and be practically worthless so that replacement at short intervals was necessary. The deterioration of the rubber did not however destroy all of the original resilience but only to such an extent that the vibration and jarring of the instrument incident to the flight of the plane were readily transmitted therethrough.

According to the present invention, the eye piece is to be constructed of two parts designated 1 and 2, the former of which is the holding or mounting part and the latter the face part. The holding part is made of ordinary commercial rubber possessing medium resiliency to enable spreading the neck 3 thereof over ribs or other projections 4 on the end of the sight tube 5 in attaching the eye piece to the gun sight. The material of the holding part is relatively tenacious and has sufficient body to provide a good connection with the tube 5. The connection preferably reinforced by a split ring clip 6 having interlocking ends 7 which permit the clip to be spread over the neck 3 and finally assembled by snapping the interlocking ends together.

The face part 2 is made of a highly resilient and readily conformable material such as sponge rubber which has the property of deteriorating less rapidly than commercial rubber and retaining a relatively high degree of resilience despite such deterioration. The part 2 is provided with an annular dove-tail shaped tongue 8 which may be compressed and inserted in a similarly conformed groove 9 in the part 1. The two parts are thus held firmly together so that cementing or other means for securing is not required. To further increase the resilience of the face part at the outer end which comes into contact with the face when the piece is held to the eye in making an observation, a deep internal annular groove 10 is made in the face part near the outer end thereof so that relatively thin walls 11 presenting a broad flat face are formed which are supported by thin walls 12 from the main portion of the face part. This construction gives a very high degree of resilience at the outer end so that the eye piece conforms nicely to the face and is quite comfortable. Furthermore, the effect of the deterioration of the rubber is lessened so far as the resilience and conformability of this portion of the eye piece is concerned, as the thin walls yield very readily under slight pressure.

We claim:

1. An eye piece for an optical device comprising in combination a mounting piece of tenacious semi-resilient material for attachment on said optical device, a face-contacting piece of a soft, conformable and very resilient material and means on said face-contacting piece co-acting with a second means in said mounting piece whereby the former is supported by the latter.

2. An eye piece for an optical device comprising in combination a mounting piece of soft rubber having medium resiliency sufficient to permit its being spread over projections on the optical device in attaching the same thereon, a face-contacting piece of sponge rubber having great resilience and conformability to be adapted to the contour of the observer's face and also to yield and prevent the transmission therethrough of vibration or jarring of the optical device and means comprising a split metal ring having interlocking ends for holding said mounting piece on said optical device.

3. In an eye piece for optical devices, an inner or mounting part of medium resilient rubber or the like for attaching the piece to the optical device, an outer or face part made of highly resilient, conformable sponge rubber to hold to the eye in observing through said device and means for holding the parts together comprising a tongue on one part to be inserted in a groove in the other part, the connection being permitted by the compressibility and resiliency of the parts.

4. In an eye piece for optical devices, an inner or mounting part for attaching the piece to the optical device made of rubber material having medium resilience, an outer or face part to hold to the eye in observing through said device made of sponge rubber material having considerable resilience and conformability, said mounting part having a groove provided therein and said face part having a tongue compressible for insertion in said groove to hold the parts together, there being an annular groove provided in the wall of said face part for decreasing the thickness of the wall and thereby increasing the resiliency and conformability thereof.

5. An eye piece for gun sights and the like comprising a tubular member including a part made of a semi-resilient material at the end which attaches to the sight, and a part made of highly resilient material at the end which is brought to the eye in observing through the sight.

6. An eye-piece for optical devices comprising a tubular mounting part of rubber material having medium resiliency and a tubular face contacting part of sponge rubber material having considerable resiliency and conformability to be adapted to the contour of the observer's face, said last mentioned part being connected at one end with the mounting part by a tongue formed integral with the former co-acting with a groove in the latter and having an internal annular groove provided therein near the other end thereof which comes in contact with the observer's face the said groove diminishing the thickness of the walls of the face contacting part.

In testimony whereof we affix our signatures.

CHARLES L. PAULUS.
ROBERT KAUCH.